(12) United States Patent
Striebel et al.

(10) Patent No.: US 12,286,997 B2
(45) Date of Patent: Apr. 29, 2025

(54) GRAB HOOK WITH SHOULDER

(71) Applicant: Suncor Stainless Inc., Plymouth, MA (US)

(72) Inventors: Patrick Striebel, Duxbury, MA (US); David Dion, Marion, MA (US); James Storrer, Middleboro, MA (US)

(73) Assignee: Suncor Stainless, Inc., Plymouth, MA (US)

( * ) Notice: Subject to any disclaimer, the term of this patent is extended or adjusted under 35 U.S.C. 154(b) by 0 days.

(21) Appl. No.: 18/604,053

(22) Filed: Mar. 13, 2024

(65) Prior Publication Data

US 2024/0309907 A1 Sep. 19, 2024

Related U.S. Application Data

(60) Provisional application No. 63/451,946, filed on Mar. 14, 2023, provisional application No. 63/451,948, filed on Mar. 14, 2023.

(51) Int. Cl.
*F16B 45/02* (2006.01)

(52) U.S. Cl.
CPC .................................. *F16B 45/023* (2021.05)

(58) Field of Classification Search
CPC ............................... F16B 45/023; F16B 45/02
See application file for complete search history.

(56) References Cited

U.S. PATENT DOCUMENTS

| | | | | |
|---|---|---|---|---|
| 4,070,823 A * | 1/1978 | Schreyer | ................. | F16G 17/00 59/93 |
| 4,280,728 A * | 7/1981 | Fredriksson | .............. | B66C 1/34 294/82.11 |
| 4,363,509 A * | 12/1982 | Schreyer | ................. | F16B 45/00 59/93 |
| 4,602,814 A * | 7/1986 | Pellolio, Jr. | ........... | F16B 45/023 24/599.7 |
| 5,456,030 A * | 10/1995 | Barone | ................. | E02F 3/3622 37/468 |
| 6,948,752 B1 * | 9/2005 | Crow | ...................... | F16G 17/00 294/82.11 |

FOREIGN PATENT DOCUMENTS

| | | | |
|---|---|---|---|
| CN | 206299182 U | * 7/2017 | |
| EP | 831248 A2 | * 3/1998 | ............. F16G 11/12 |

* cited by examiner

*Primary Examiner* — Bayan Salone
(74) *Attorney, Agent, or Firm* — ArentFox Schiff LLP; Joseph P. Quinn (57) ABSTRACT

A fastener assembly device includes a body. The body includes top and bottom regions, a channel within the body, and a recess defined in the channel. The recess is wider than any other area of the body.

8 Claims, 7 Drawing Sheets

GRAB HOOK WITH SHOULDER

CROSS-REFERENCE TO RELATED APPLICATIONS

The present application claims the benefit of provisional application No. 63/451,946, filed Mar. 14, 2023, and provisional application No. 63/451,948, filed Mar. 14, 2023.

FIELD OF TECHNOLOGY

The present disclosure is in the field of grab and slip hooks, and more particularly, in the field of grab and slip hook assemblies for securing a linkage to a device.

BACKGROUND

Grab hooks are a type of lifting or rigging hardware used to securely attach and lift loads with chains or straps. They typically feature a hook with a narrow throat and a latch or latch mechanism that closes the opening, preventing the chain or strap from slipping out. Grab hooks are designed to grab onto the chain or strap securely, providing a reliable connection point for lifting and securing heavy loads. Slip hooks, also known as clevis slip hooks, are a type of rigging hardware commonly used for lifting and securing loads. They consist of a hook with a clevis pin and a latch mechanism. The clevis pin allows the hook to be attached to chains, ropes, or straps, while the latch mechanism helps secure the load by preventing accidental disengagement. The distinguishing feature of slip hooks is their ability to slip onto a chain or other attachment point without the need for additional tools or hardware. This makes them convenient for quickly connecting and disconnecting loads during lifting or securing operations. Both hooks are commonly used in in industries such as construction, transportation, agriculture, and manufacturing for tasks involving lifting, towing, or securing objects.

SUMMARY

According to one aspect, a fastener assembly is provided. The assembly includes a body, which includes top and bottom regions. The assembly includes a channel within the body and a recess defined in the channel. The recess is wider than any other area of the body.

In some implementations of the assembly, the channel includes a first edge and a second edge, with each of the first and second edges including one or more sloped regions. In some implementations of the assembly, the first edge and second edge are positioned within the channel.

In some implementations of the assembly, the bottom region includes a beveled region. In some implementations of the assembly, the recess includes one or more contours. In some implementations of the assembly, the one or more contours are axially orientated about the recess.

In some implementations of the assembly, the beveled region is coupled to a surface, wherein the surface is coupled to a subsurface. In some implementations of the assembly, the surface is coupled to the subsurface using fasteners. In some implementations of the assembly, the recess further includes an inner surface with an angle no less than 45 degrees. In some implementations of the assembly, the one or more sloped regions include an angle of no less than the angle of the inner surface of the recess. In some implementations of the assembly, the bottom region is concave.

In some implementations of the assembly, a latch for securing the channel in included. In some implementations of the assembly, the channel accommodates a linkage, wherein the linkage includes a width between 0.25 inches and 0.75 inches. In some implementations of the assembly, the channel includes an inner surface, which includes a non-zero angle, and at least one or more sloped regions along an edge of the channel.

According to another aspect, a fastening system is provided. The fastening system includes a body with one or more curved surfaces and an opening for receiving linkages. The opening includes a channel and a recess including an inner surface and one or more contours.

In some implementations of the system, the one or more curved surfaces of the body include a top edge of the body, wherein the top is adjacent to the opening. In some implementations of the system, the inner surface utilizes a non-zero angle to apply a retaining force, wherein the retaining force mitigates damage to linkages received within the channel. In some implementations of the system, the one or more contours dissipates stress points from the linkages. In some implementations of the system, the channel accommodates a linkage, wherein the linkage includes a width between 0.25 inches and 0.75 inches.

According to another aspect, a method of fastening an assembly to a linkage is provided. The method includes introducing the linkage to a channel of the fastener assembly. The method includes positioning the linkage towards a recess of the channel within a body of the fastener assembly, with at least one sloped region on an edge of the channel. The method further includes retaining the linkage within the channel within the recess at an angle of no less than 45 degrees, and performing a fastening operation.

DETAILED DESCRIPTION

Aspects of the present disclosure include various implementations of grab and slip hooks. Each of the hooks is provided in a weld-on configuration and a bolt on configuration. In implementations, the weld-on hook can be utilized for welding directly onto a structure. In implementations, the bolt-on hook can also include the weld-on hook, as it is welded to a mounting plate (for both grab & slip hooks) before fastening the hook with bolts to a structure. Backing plates may be available to both the grab and slip hooks. These grab hooks may accommodate linkages, such as chains, ropes, cords, and like components. In some implementations, these linkages may include thicknesses of ¼", 5/16", ⅜" and ½"; however, other implementations may utilize alternate linkage dimensions. According to the present disclosure, these hook assembly systems can be arrayed, interchanged, and/or configured across a number of size categories of plates and hooks.

Traditional grab hooks may have a vee groove shape, with a 38°-45° angle to hold a linkage. However, disadvantageously, when using the loop method, this vee shape creates a point load can damage a chain link by bending the link. When using the choker method, the link in a traditional hook can fail in single shear before reaching chain-breaking strength. In some cases, the breaking strength is reduced by up to 28%. As a result, some manufacturers recommend a 20% reduction in the working load limit to compensate for premature damage.

Heretofore known hook designs to mitigate the above-mentioned point-load and shearing problems include saddle, wings, or cradle support to prevent the chain link from distorting or shearing prematurely. For example, U.S. Pat. No. 4,070,823 describes one of the earliest hook designs intended to prevent premature chain damage due to the above-mentioned point loads and shearing problems. Each of these previously known hook designs are configured to be used for in-line pull in a set direction that is self-aligning.

Figure 7:
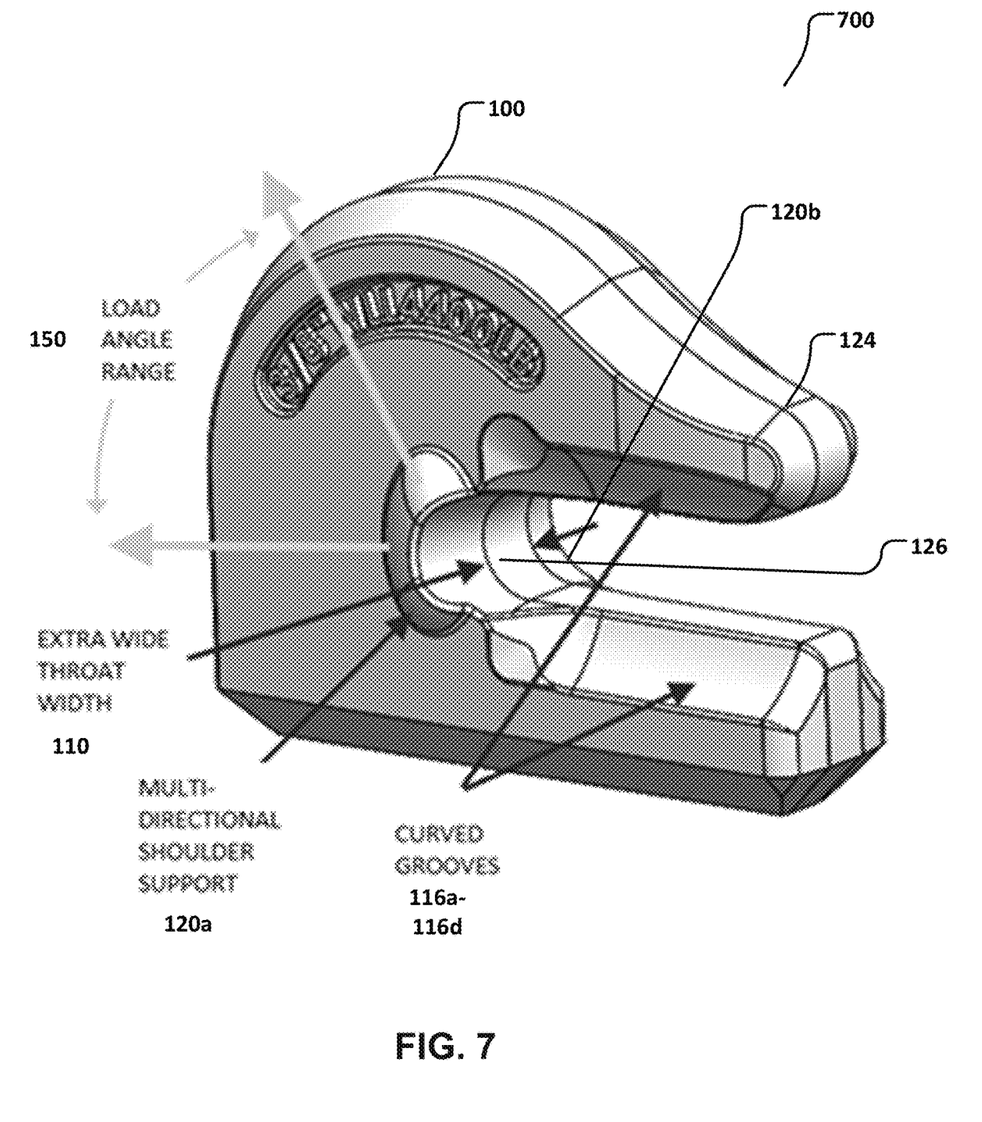
FIG. 7 is a perspective view of the grab hook of FIGS. 1 and 2, illustrating the multi-direction support shoulder for choker loading and extra wide throat to support linkage loop loading, according to an aspect of the present disclosure; and Like reference numerals in different Figures indicate like elements.

To address these issues, these hooks can also be designed with a multi-direction support shoulder. In implementations, this can assist with choker loading, and include an extra wide throat to support linkage loop loading. This can include both grab hooks, as illustrated in FIGS. 1, 2, and 7, and slip hooks (not shown).

Figure 1:
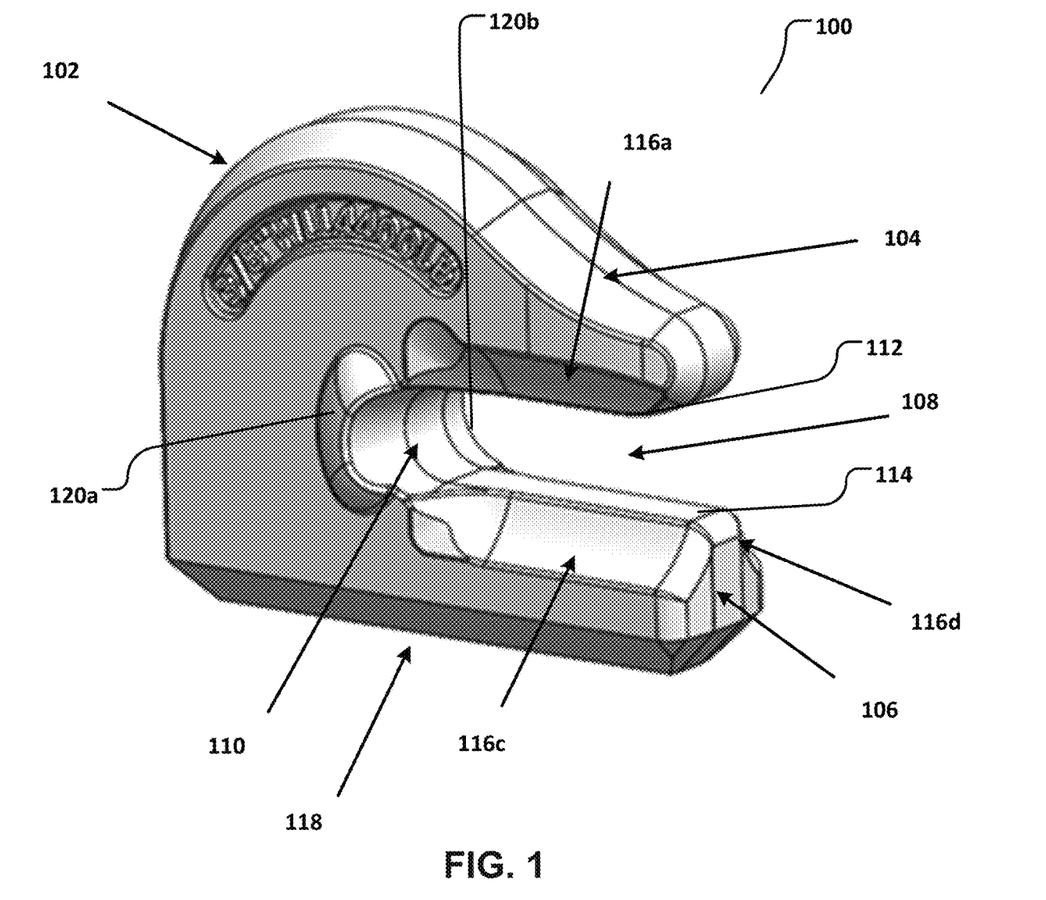
FIG. 1 is a perspective view of an exemplary welded grab hook, according to an aspect of the present disclosure.
Figure 2:
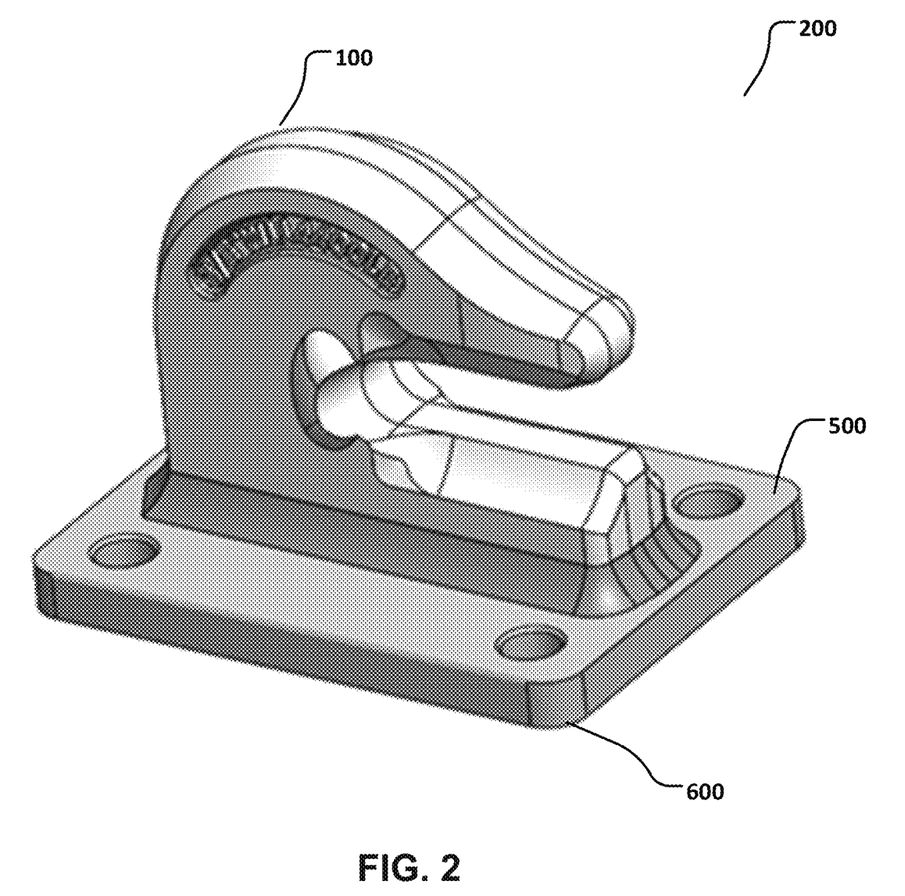
FIG. 2 is a perspective view of an exemplary bolted grab hook, according to an aspect of the present disclosure.

FIG. 1 is a perspective view of an exemplary welded grab hook 100, according to an aspect of the present disclosure. Grab hook 100, which may also be referred to as fastener assembly 100, can include body 102, which can itself be defined by top region 104, bottom region 106, channel 108, and recess 110. As shown in FIG. 1, channel 108 may be defined within the body 102, and recess 110 may be defined within the channel 108. In implementations, channel 108 may include at least a first edge 112 and a second edge 114. Each of the first edge 112 and second edge 114 may include one or more sloped regions, such as regions 116a, 116b (opposite 116a, and not shown), 116c, and 116d. In implementations, first edge 112, second edge 114, and/or one or more sloped regions 116a-116d can assist with introducing a linkage, such as a chain, into the hook 100, and allow for it to readily manipulated within channel 108 and/or recess 110.

Also shown in FIG. 1, recess 110 may include one or more contours 120a and 120b. These contours 120a and 120b, which may be axially orientated about the recess 110, can serve as a multi-direction support shoulder when a linkage is introduced into channel 108 of hook 100, as previously introduced. This can help prevent the linkage from distorting and/or shearing prematurely, and will be discussed at greater length in FIG. 7.

Figure 3:
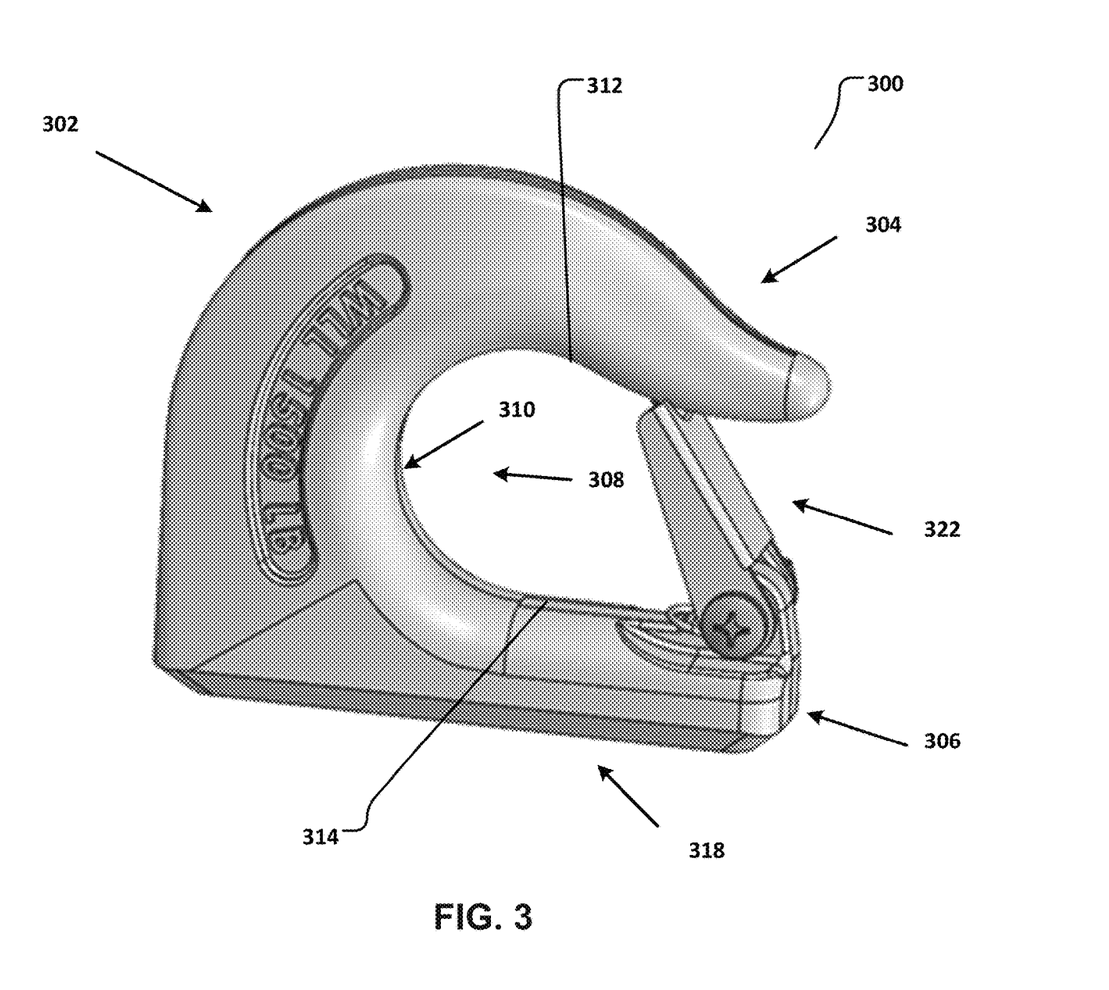
FIG. 3 is a perspective view of an exemplary welded slip hook, according to an aspect of the present disclosure

Bottom region 106 of FIG. 1 also includes beveled region 118. This region 118, as shown in FIGS. 1 and 2, can be concave for more ready fastening to surfaces. In implementations, beveled region 118 can be coupled to a surface, such as mount plate 500. This coupling can include welding without a surface and/or subsurface, as shown in FIGS. 1 and 3, or bolting/welding to a surface and/or subsurface, or other like methods. Grab hook 100 can also include a clevis and/or an eye, in some implementations.

FIG. 3 is a perspective view of an exemplary welded slip hook 300, according to an aspect of the present disclosure. Slip hook 300, which can also be referred to as fastener assembly 300, is similar to grab hook 100. Slip hook 300 can include body 302, which can itself be defined by top region 304, bottom region 306, channel 308, and recess 310. As shown in FIG. 3, channel 308 may be defined within the body 302, and recess 310 may be defined within the channel 308. Channel 308 may include at least a first edge 312 and a second edge 314. In implementations, first edge 312 and/or second edge 314 can assist with introducing a linkage, such as a chain, into the hook 300, and allow for it to readily manipulated within channel 308 and/or recess 310.

FIG. 3 may further include latch 322, which may be configured on second edge 314 of bottom region 306 to open and close along the interior of first edge 312 of top region 304. Latch 322 may include a spring—and bolt type mechanism, and may be activated when latch 322 receives a pressing force upon its face. In implementations, once latch 322 receives this pressing force, it can spring closed behind the object introducing the force, and can thereby secure channel 308 and prevent the exit of these objects, which can include linkages such as ropes, chains, and like components.

While not shown in FIG. 3, recess 310 can include one or more contours. These contours, which may be axially orientated about the recess 310, can serve as a multi-direction support shoulder when a linkage is introduced into channel 308 of hook 300, as previously introduced. This can help prevent the linkage from distorting and/or shearing prematurely, and will be discussed at greater length in FIG. 7.

Figure 4:
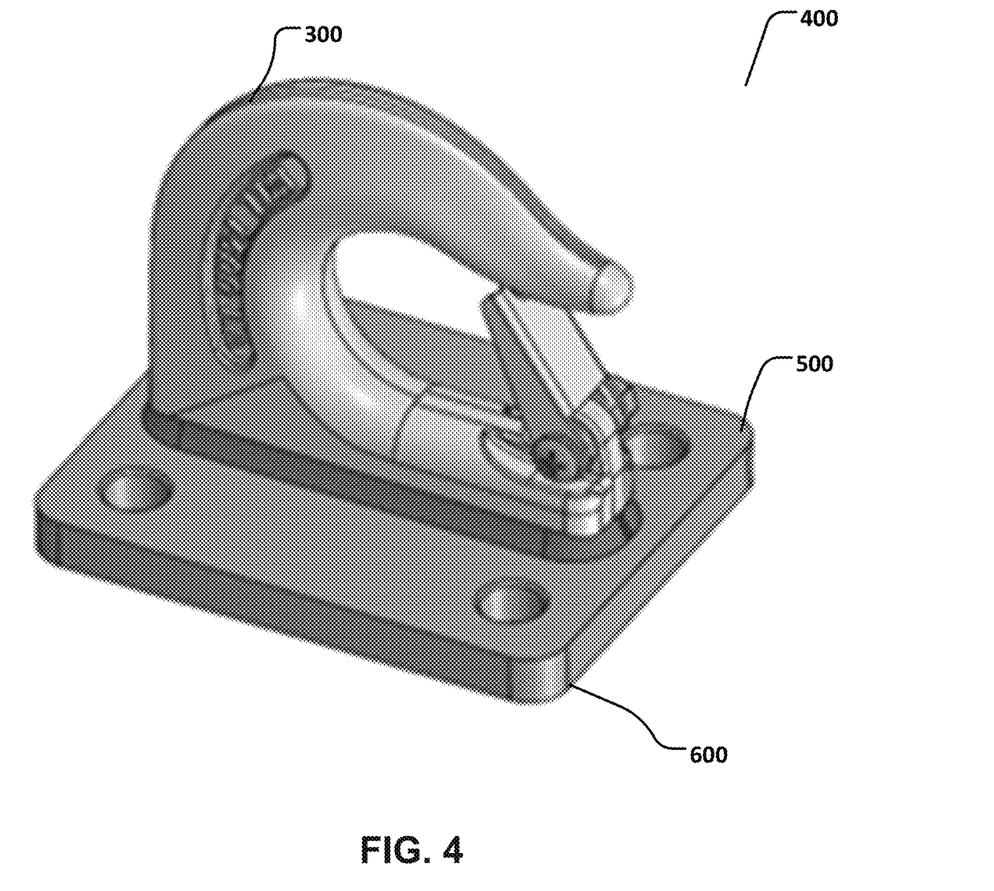
FIG. 4 is a perspective view of an exemplary bolted slip hook, according to an aspect of the present disclosure.

Bottom region 306 of FIG. 3 also includes beveled region 318. This region 318, as shown in FIGS. 3 and 4, can be concave for more ready fastening to surfaces. In implementations, beveled region 318 can be coupled to a surface, such as mount plate 500. This coupling can include welding without a surface and/or subsurface, as shown in FIGS. 1 and 3, or bolting/welding to a surface and/or subsurface, as shown in FIGS. 2 and 4, or other like methods.

Figure 5:
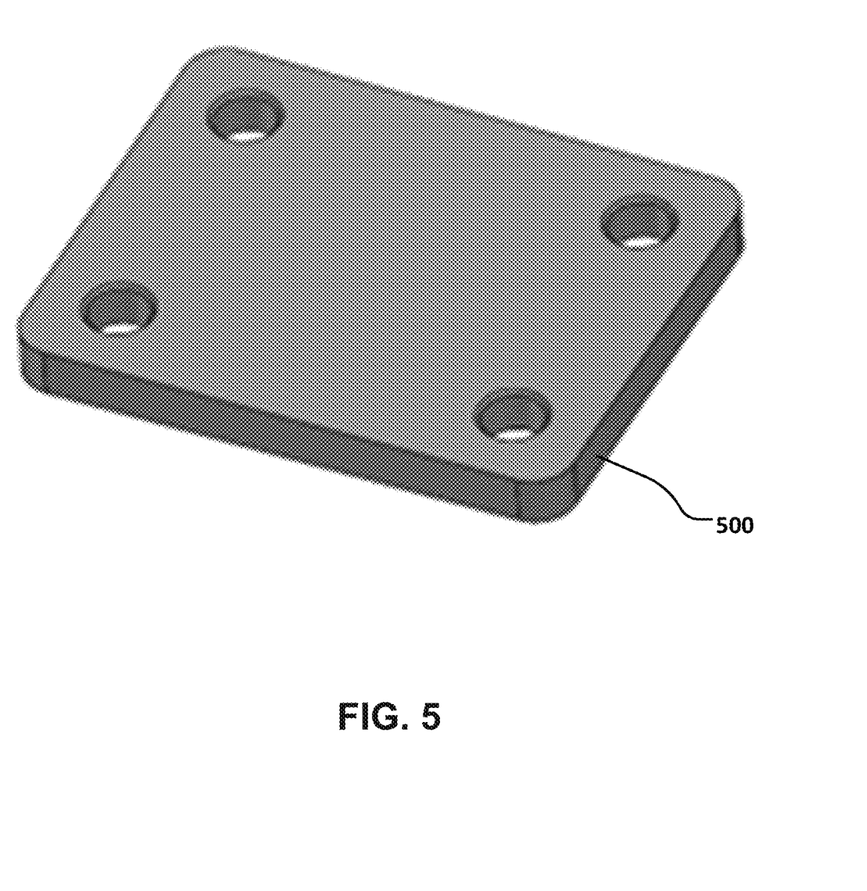
FIG. 5 is a perspective view of an exemplary mount plate, according to an aspect of the present disclosure.
Figure 6:
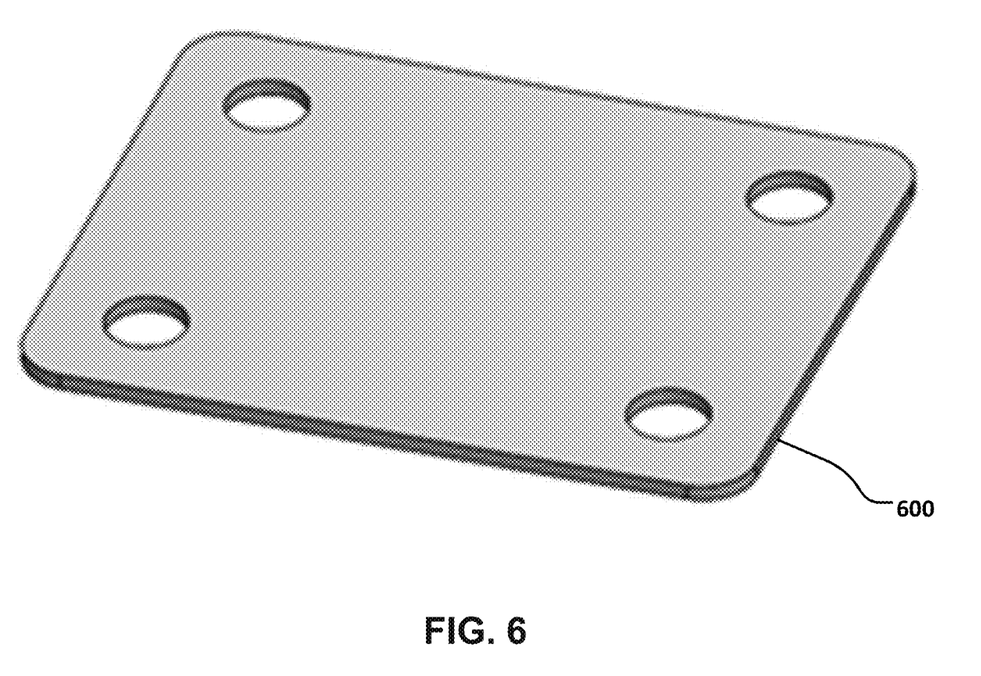
FIG. 6 is a perspective view of an exemplary backing plate, according to an aspect of the present disclosure.

FIG. 5 is a perspective view of an exemplary mount plate 500, and FIG. 6 is a perspective view of an exemplary backing plate, according to aspects of the present disclosure. Mount plate 500 can be further coupled to a subsurface, such as backing plate 600. Backing plate 600 may be the same dimensions as mount plate 500, but thinner, so as to be disposed beneath. In implementations, mount plate 500 can be coupled to backing plate 600 via fasteners, welding, adhesive, bolts, or like methods. Backing plate 600 can be thereby mounted on the underside of mount plate 500 as relating to hooks 100 and/or 300 via bolting, for re-enforcement strength to the overall assembly. In implementations, and as shown in views 200 and 400 in FIGS. 2 and 4, respectively, beveled regions 118 and 318 of hooks 100 and 300, respectively, can be welded onto a moving device, which can include a surface such as mount plate 500. These hooks 100 and/or 300 may be used for chain pulling applications, fibrous webbing, rope loops, and/or shackle attachments, with each hook 100 and/or 300 capable of being sized with specific groove design for the corresponding linkage size.

FIG. 7 is a perspective view 700 of the grab hook 100 of FIGS. 1 and 2, illustrating the advantages offered by recess 110, one or more contours 120a and 120b, and/or sloped regions 116a-116d. While grab hook 100 is illustrated, slip hook 300 can also possess like advantages and/or features, in some implementations. Top region 104 and/or bottom region 106, which may also be referred to as one or more curved surfaces, include an opening, which can be channel 108, and can include top edge 124 of body 102, which may be adjacent to the opening 108.

In FIG. 7, recess 110 includes an extra wide throat width, as previously introduced, referred to as one or more contours 120*a* and 120*b*, which can also be referred to as shoulder supports 120*a* and 120*b*. In some implementations, channel 108 accommodates a linkage with a width between 0.25 inches and 0.5 inches. In some implementations, the linkage has a width between 0.25 and 0.75 inches. In this way, one or more contours 120*a* and 120*b* can reduce and/or dissipate stress points from linkages during use. In some implementations, sloped regions 116*a*-116*d*, also referred to as curved grooves 116*a*-116*d*, can further assist with reducing and/or dissipating stress points from linkages during use, as the linkage moves freely within opening/channel 108 without applying too much stress along first edge 112 and/or second edge 114. In addition, one or more contours 120*a* and 120*b* can prevent the linkage from distorting the hook 100 in the choker method.

In an implementation of the present disclosure, grab hook 100 fitting is fixed, and the linkage can pull in a range of angles, as shown in load angle range 150 of FIG. 7. Recess 110, which can also include inner surface 126, can itself include a non-zero angle as a result of the width of one or more contours 120*a* and 120*b*. In some implementations, recess 110 further includes inner surface 126 with an angle no less than 45 degrees when retaining a linkage within channel 108. In some implementations, one or more sloped regions 116*a*-116*d* include an angle of no less than the angle of the inner surface 126 of the recess 110. In some implementations, inner surface 126 can utilize a non-zero angle to apply a retaining force, as the retaining force mitigates damage to linkages received within the channel 108.

In practice, a user can fasten an assembly, such as hooks 100 and/or 300, to a linkage by introducing the linkage to channel 108 of the fastener assembly 100 and/or 300 by positioning the linkage towards recess 110 of channel 108 within body 102 of the fastener assembly 100 and/or 300. By way of at least one sloped region 116*a*-116*d*, which can be an edge 112 and/or 114 of channel 108, hook 100 and/or 300 can retain the linkage within the channel 108 within the recess 110 at an angle of no less than 45 degrees to successfully perform a fastening operation, as disclosed herein.

In an illustrative embodiment such as the embodiment shown in FIG. 7, the present source application includes a fixable grab hook, having a general C-shaped hook body defined by a top region, a bottom region, and bridging portion connecting the top region and bottom regions together at one end in a spaced relation to define a throat therebetween within which a link of chain is releasably engageable. The fixable grab hook includes a protruding contour extending transversely outwardly of the hook body around the bridging portion, from the top region to the bottom region, and provides therewith a multi-directional support shoulder for supporting the link of chain throughout a range of load angles without creating localized stresses which would cause the link of chain to fail prematurely.

As shown in FIG. 7, the fixable grab hook may include a pair of protruding contours extending transversely outwardly of the hook body around the bridging portions in opposite directions from the hook body, from the top region to the bottom region, to provides therewith an extra wide throat and a pair of multi-directional support shoulders for supporting the link of chain throughout a range of load angles from either side of the hook body without creating localized stresses which would cause said link of chain to fail prematurely.

The fixable grab hook shown in FIG. 7 also includes a bevel around the throat to the protruding contour, in which the bevel has a bevel angle of no less than 45 degrees. In addition, a first pair of bevels may extends along the top region and a second pair of bevels extends along the bottom region. In an illustrative embodiment, at least one of the first pair of chamfers and second pair of chamfers has a bevel angle no less than said bevel angle around said throat to said protruding contour.

In the fixable grab hook shown in FIG. 7 a first pair of concave curved chamfers and a second pair of concave curved chamfers are shown in place of the first and second pair of bevels, respectively. The first pair of curved chamfers define outward facing curved grooves extending along the top region the second pair of concave curved chamfers defining outward facing curved grooves extending along said bottom region.

In an illustrative embodiment, the fixable grab hook may have a non-zero angle between an inner surface of the top portion and an inner surface of the bottom portion.

As shown in FIG. 7, the fixable grab hook includes a flat bottom surface of the hook body for welding to a mounting surface or plate and a beveled edge between the flat bottom surface and a side surface of the body.

The fittings disclosed herein are fabricated from stainless steel. In some implementations, the disclosed mounting plates are either 316 L or 304 L low carbon grade for welding. The backing plate is either 316 or 304 stainless steel. Although the disclosed implementations, are made from stainless steel, it should be understood that various alternative implementations may be made from other metals, such as brass, bronze, aluminum and the like.

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A fixable grab hook, having a general C-shaped hook body defined by a top region, a bottom region, and bridging portion connecting the top region and bottom regions together at one end in a spaced relation to define a throat therebetween within which a link of chain is releasably engageable, the fixable grab hook comprising:
   a protruding contour extending transversely outwardly of said hook body around said bridging portion, from said top region to said bottom region, and providing therewith a multi-directional support shoulder for supporting said link of chain throughout a range of load angles without creating localized stresses which would cause said link of chain to fail prematurely.

2. The fixable grab hook of claim 1, comprising a flat bottom surface of the hook body for welding to a mounting surface or plate.

3. The fixable grab hook of claim 2, comprising a beveled edge between the flat bottom surface and a side surface of the body.

4. The fixable grab hook of claim 1, comprising a pair of protruding contours extending transversely outwardly of said hook body around said bridging portions in opposite directions from said hook body, from said top region to said bottom region, and providing therewith an extra wide throat and a pair of multi-directional support shoulders for supporting said link of chain throughout a range of load angles from either side of said hook body without creating localized stresses which would cause said link of chain to fail prematurely.

5. The fixable grab hook of claim 1, comprising: a first pair of concave curved chamfers defining outward facing curved grooves extending along said top region; and a second pair of concave curved chamfers defining outward facing curved grooves extending along said bottom region.

6. The fixed grab hook of claim 1, comprising: a bevel around said throat to said protruding contour, the bevel having a bevel angle of no less than 45 degrees.

7. The fixed grab hood of claim 1, comprising: a first pair of bevel extending along said top region; and a second pair of bevels extending along said bottom region, wherein at least one of the first pair of chamfers and second pair of chamfers has a bevel angle no less than said bevel angle around said throat to said protruding contour.

8. The fixed grab hook of claim 3, comprising a non-zero angle between an inner surface of said top portion and an inner surface of said bottom portion.

\* \* \* \* \*